(12) United States Patent
Strassle et al.

(10) Patent No.: US 9,476,441 B2
(45) Date of Patent: Oct. 25, 2016

(54) CLAMPING DEVICE FOR THE RELEASABLE CONNECTION OF TWO PROFILE SECTIONS

(71) Applicants: Marcel Strassle, Kirchberg (CH); Kurt Zullig, Kirchberg (CH)

(72) Inventors: Marcel Strassle, Kirchberg (CH); Kurt Zullig, Kirchberg (CH)

(73) Assignee: SYMA INTERCONTINENTAL AG, Kirchberg (CH)

( * ) Notice: Subject to any disclaimer, the term of this patent is extended or adjusted under 35 U.S.C. 154(b) by 219 days.

(21) Appl. No.: 13/920,413

(22) Filed: Jun. 18, 2013

(65) Prior Publication Data

US 2014/0010587 A1 Jan. 9, 2014

(30) Foreign Application Priority Data

Jul. 9, 2012 (EP) ..................................... 12175588
Jul. 12, 2012 (EP) ..................................... 12176195

(51) Int. Cl.
*F16B 7/04* (2006.01)

(52) U.S. Cl.
CPC ........... *F16B 7/0446* (2013.01); *F16B 7/0473* (2013.01); *Y10T 403/39* (2015.01)

(58) Field of Classification Search
CPC .. F16B 7/0446; F16B 7/0453; F16B 7/0473; F16B 7/22; F16B 2/20; E04B 2/766; E04B 2/767; E04B 2001/2403; E04B 2001/2409; E04B 2001/2415; A47B 47/0016; A47B 47/005; A47B 47/028; A47B 47/03; A47B 57/40; A47B 57/406; A47B 57/16; A47B 57/54; Y10T 403/30
See application file for complete search history.

(56) References Cited

U.S. PATENT DOCUMENTS

| | | | | |
|---|---|---|---|---|
| 1,974,050 A | * | 9/1934 | Keil | ............................... 248/243 |
| 3,559,357 A | * | 2/1971 | Lowe | ............................ 52/282.4 |
| 3,666,303 A | * | 5/1972 | Huls | ....................... F16B 12/02 |
| | | | | 108/108 |
| 3,715,849 A | * | 2/1973 | Strassle | ........................... 52/646 |
| 4,133,433 A | * | 1/1979 | Wolf | ............................. 211/192 |

(Continued)

FOREIGN PATENT DOCUMENTS

| | | |
|---|---|---|
| CN | 1207796 A | 2/1999 |
| DE | 4328832 A1 | 3/1995 |

(Continued)

OTHER PUBLICATIONS

Patent Search Report issued in corresponding Eurasian Patent Application No. 201370132 dated Dec. 20, 2013.

(Continued)

*Primary Examiner* — Jonathan Masinick
(74) *Attorney, Agent, or Firm* — Sughrue Mion, PLLC

(57) ABSTRACT

A clamping device for the releasable connection of a first profile section with a second profile section, wherein the clamping device can be introduced into a recess provided in the first profile section, and is provided with at least one hook element for purposes of engaging with the first profile section and with a clamping element. Thus, the at least one hook element can be brought into a releasable retentive engagement with at least one locking element of the first profile section that is complementary to the former. The clamping device comprises for this purpose a plate, wherein the at least one hook element is aligned in the plane of the plate on the first profile section, and the clamping element is provided on the opposing side of the plate relative to the hook element, so as to clamp the plate against the second profile section.

9 Claims, 10 Drawing Sheets

(56) References Cited

U.S. PATENT DOCUMENTS

| | | | | |
|---|---|---|---|---|
| 4,607,754 | A | * | 8/1986 | Wolf ............................. 211/183 |
| 4,615,503 | A | * | 10/1986 | Garfinkle ............. A47B 57/265 248/220.31 |
| 4,700,916 | A | * | 10/1987 | Bastian et al. ............. 248/224.8 |
| 4,712,286 | A | * | 12/1987 | Wolf ............................... 29/463 |
| 5,188,326 | A | * | 2/1993 | Zich ......................... 248/220.41 |
| 5,499,667 | A | * | 3/1996 | Nakanishi ..................... 144/365 |
| 5,636,934 | A | * | 6/1997 | Nakanishi et al. ........... 403/230 |
| 6,202,965 | B1 | * | 3/2001 | Chong .................. A47B 47/05 248/220.43 |
| 8,161,707 | B2 | * | 4/2012 | Simmons ..................... 52/648.1 |
| 2007/0294953 | A1 | * | 12/2007 | Guillen .......................... 52/36.1 |

FOREIGN PATENT DOCUMENTS

| | | |
|---|---|---|
| DE | 298 01 042 U1 | 6/1999 |
| EP | 0599178 A1 | 6/1994 |
| WO | 97/25536 A1 | 7/1997 |
| WO | 99/09326 A1 | 2/1999 |
| WO | 9909326 A1 | 2/1999 |
| WO | 2010/057324 A1 | 5/2010 |

OTHER PUBLICATIONS

Communication dated Dec. 27, 2015 from the Intellectual Property Office of the P.R. China issued in corresponding Application No. 2013102565187.

* cited by examiner

CLAMPING DEVICE FOR THE RELEASABLE CONNECTION OF TWO PROFILE SECTIONS

CROSS-REFERENCE TO RELATED APPLICATION

This application relates to and claims the benefit of priority from European Patent Application Nos. 12 175 588.8, filed Jul. 9, 2012 and EP 12 176 195.1, filed Jul. 12, 2012, the entire disclosure of which is incorporated herein by reference.

TECHNICAL FIELD

The present invention concerns a clamping device for the releasable connection of two profile sections, in particular a first with a second profile section, wherein the clamping device can be introduced into a recess provided in the first profile section, with at least one hook element for purposes of engagement with the first profile section, and with a clamping element, with which the at least one hook element can be brought into releasable engagement with at least one locking element of the first profile section that is complementary to the former.

PRIOR ART

A clamping device of the type cited above is, for example, of known art from WO 99/09326 of the applicant. The clamping device of known art comprises a locking sleeve inserted into a first profile section, which can be locked together with corresponding elements in the second profile section. Such clamping devices are provided for the purpose of connecting two profile sections with one another. Here the one profile section usually takes the form of a profiled bar, on which a wall profile is positioned. The wall profile can also have a cross member and usually has a greater transverse extent than a profiled bar primarily aligned along the longitudinal axis. In the wall profile an internal recess is provided at the side for each clamping device, into which the clamping device can be slid up to the projecting hook element.

Such a clamping device is also of known art from WO 97/25536, where on the one side of the wall surface a round hole is provided, through which the locking head extends, after it has been advanced through the recess against the action of a spring force recessed in the clamping device up to the hole, into which it latches. Here the said locking sleeve is therefore advanced in a recess of the wall plate and on at least the one side of the wall plate an operating button protrudes out of the latter—in particular is flush with the latter. The said operating button at the same time accommodates tractive forces, which act on the wall plate and attempt to separate the latter from the profile strip.

PRESENTATION OF THE INVENTION

In each case these devices have a locking sleeve, in which the hook elements and clamping elements are integrated. Thus for purposes of transferring larger forces correspondingly larger sleeves are provided, which makes the arrangement of such elements more complex and more resource intensive, in particular if the loads that are to be borne are not only wall elements or formwork, but if such a profile section is a horizontal member of a frame, on which, for example, a floor area of a further upper floor is provided, so that the loads of the latter must be supported.

It is therefore an object of the present invention to specify a clamping device, which ensures the said load support in the simplest possible manner.

A clamping device for the releasable connection of a first profile section with a second profile section, which can be introduced into a recess provided in the first profile section, and which has the features of the preamble of Claim 1, then has the identifying features of the said claim.

A clamping device is provided for the releasable connection of a first profile section with a second profile section, wherein the clamping device can be introduced into a recess provided in the first profile section, and is provided with at least one hook element for purposes of engaging with the first profile section and with a clamping element. Thus the at least one hook element can be brought into a releasable retentive engagement with at least one locking element of the first profile section that is complementary to the former. The clamping device comprises for this purpose a plate, whereby the at least one hook element is aligned in the plane of the plate on the first profile section, and the clamping element is provided on the opposing side of the plate relative to the hook element, so as to clamp the plate against the second profile section.

The clamping element can then comprise a screw or a bolt connected with the plate, which projects into a cavity provided behind the plate, so that it can be clamped with securing elements against the second profile section.

The clamping element can be a screw and the securing element is then, for example, a nut. In particular a retaining clamp can then be arranged under the screw, which with longitudinal grooves can then engage with the two side walls forming the cavity accommodating the plate, so as to transfer the force in a rotationally secure manner onto the very thin wall elements over a larger surface area.

The clamping element can also be a bolt, wherein the securing element then comprises a lever lock, that is to say a lever that can change sides, with which via a sequence curve a clamping force is transferred onto the bolt, advantageously passing through a dead point.

The locking elements can be bolts that project transversely through the recess, so as on assembly to be encompassed by the one or more hook elements and so as to be tightened relative to the plate by means of the clamping element for locking purposes. Such bolts can have a transverse hole for purposes of accommodating a retaining pin, if the other end has a flange. Here the bolts are provided in transverse holes.

At the same time the wall behind the recess in the region of the bolts can comprise a breakthrough so as to permit the slider plate to engage behind the bolts. Here the breakthrough of the wall behind the recess is, for example, a slot. Here the lower edge of the breakthrough or penetration of the wall behind the recess can serve as an abutment for the lower edge of the slider plate.

The plate with its upper face can be clamped in primary and load-bearing contact in the second profile section, and the lower face of the plate can be supported in a load-bearing manner on a surface of the first profile section. Alternatively the lower face of the hook recess(es) can be supported on element(s) connected with the plate in a load-bearing manner.

Steel bolts inserted in aluminium profiles as posts, in particular with a somewhat increased diameter such as 10 to 15 millimetres relative to the wall thickness of a slot to allow engagement by the noses, have load-bearing advantages.

They can be provided in a press fit and are thus captively connected with the aluminium profile. The supporting surface is then in the lateral flanks of the walls and is thus more stable than in the height over perhaps a plurality of slots in the rear wall.

Further forms of embodiment are specified in the dependent claims.

BRIEF DESCRIPTION OF THE DRAWINGS

Preferred forms of embodiment of the invention are described in the following paragraphs with the aid of the drawings, which serve solely to provide explanation, and are not to be construed as restrictive to the invention. In the drawings.

DESCRIPTION OF PREFERRED FORMS OF EMBODIMENT

Figure 1:
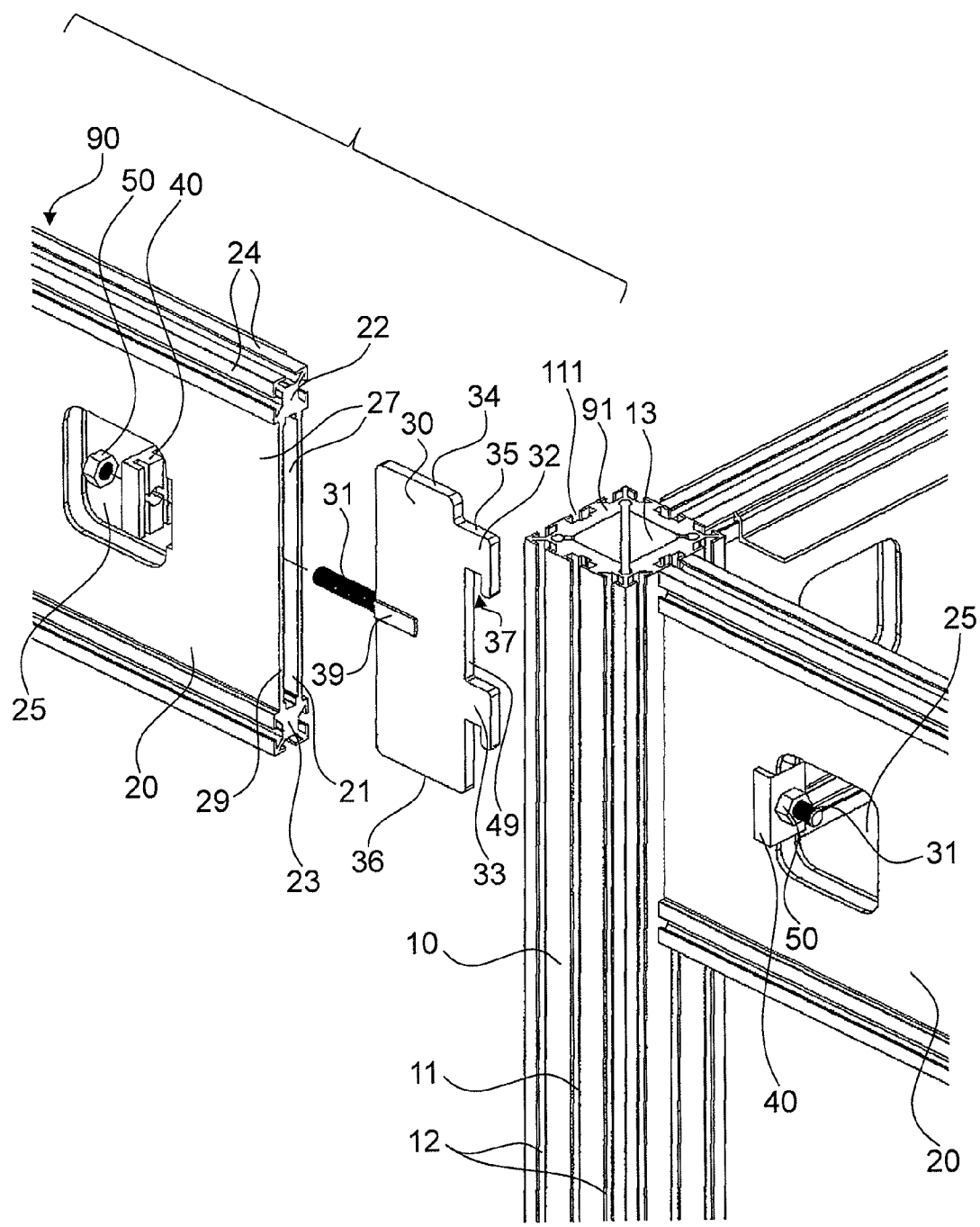
FIG. 1 shows a perspective view of a deployment of an example of embodiment of a clamping device in accordance with the invention on a vertical post profile.

FIG. 1 shows a perspective view of a deployment of an example of embodiment of a clamping device in accordance with the invention on a vertical post profile 10. The post profile 10 is a first profile section, which post is usually erected vertically. It is, for example, an aluminium profile with an internal cavity 13 and with at least one central groove 11 on each of its four sides as an attachment groove. Here it takes the form of a post 10 with in each case two further lateral grooves 12 provided on either side of the central groove 11. Usually the wall elements, not represented here, are attached in these grooves 11, 12 and 13 and retained by means of fasteners engaging transversely with the undercuts of the grooves.

In the present invention, however, the objective is to attach a second transversely oriented profile section to the first profile section 10, which second profile section can divert loads acting on its upper face 90 onto the post 10.

On the right-hand side of the figure two second profile sections 20 are already attached as cross members to the central post 10. In particular the attachment takes the form, as will be apparent from the following description, of a nut 50 being placed on a locking screw 31 and a retaining clamp 40 thereby pressing onto an internal wall of the said cross member 20.

In an exploded representation in FIG. 1 a further second profile section 20 is represented on the left-hand side of the figure, before it is attached to the post profile 10.

The second profile section 20 has an upper profile rail 22 with three extension grooves 24, which are aligned upwards and to both sides, and which advantageously, but not necessarily, have undercuts. At the lower end a lower profile rail 23 is provided, likewise with three extension grooves. In between there extends a connecting wall, hollow at least in this end region of the cross member 20, which consists of two side walls 27, between which there exists an accommodation cavity 21.

The accommodation cavity 21 ends in the region of the upper and lower profile rails 22 and 23 in a stepped guidance grove 26, in which the slider plate 30 is guided. The slider plate 30 is an essentially rectangular element with planar opposing side walls, to which at the rear in the centre a locking screw 31 is attached, wherein the latter is integrally connected via the connecting element 39 with the slider plate. Here the slider plate can simply take the form of a metal plate 30, which has a recess in the region of the connecting element 39, into which is inserted a flattened end of the locking screw 31 without any thread. The dimensions of the accommodation cavity 21 and the slider plate 30 are configured such that the upper edge 34 and the lower edge 36 in each case fit into the opposing guidance grooves 26, and when the slider plate is slid into the recess 21 the locking screw 31 projects into the locking recess 25, while on the other side the two hooks 32 and 33 project beyond the edges of the front walls 27 of the second profile section 20. The locking screw 31 passes through a central opening 42 of the retaining clamp 40 and is tightened up by means of a nut 50.

The two hooks 32 and 33 project beyond a front locating edge 49. In the upper region the upper side face 34 is offset downwards in the form of an offset step 35.

In the central groove 11 of the post profile 10 various recesses passing through the wall of the post profile 10 and thus gaining access to the inner cavity 13 (and not represented in FIG. 1) are provided (slots 14 and 15 in FIG. 7), into which the hooks 32 and 33 can be inserted. Here the recesses 14 and 15 are arranged such that when the hooks 32 and 33 are hooked in place by means of the hook cavity 37 the upper edge 91 of the upper profile rail 22 assumes a pre-defined position that is advantageously flush with the end 91 of the post profile 10. For the two second profile sections 20 already delineated on the right-hand side precisely the same is true.

Figure 2:
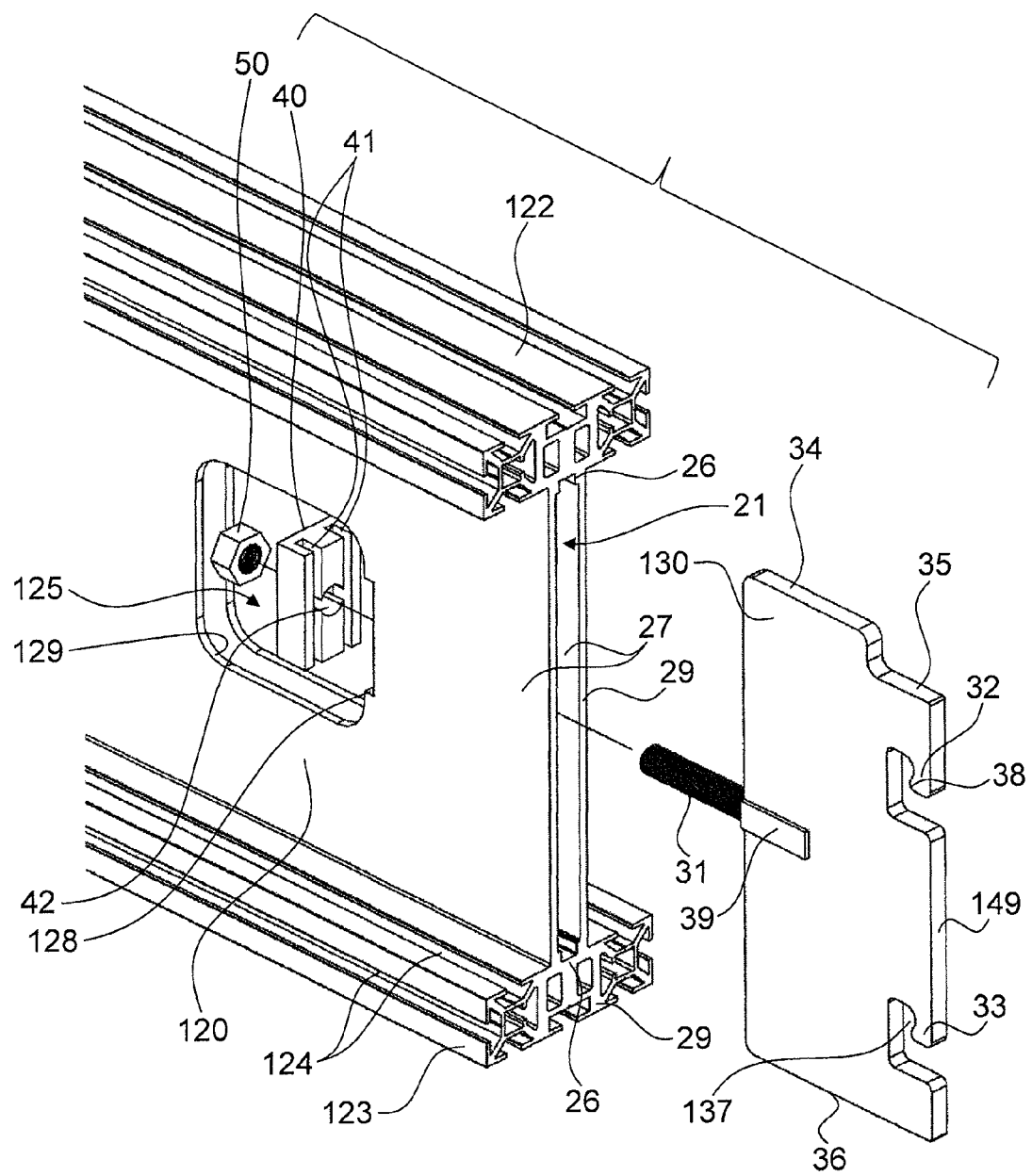
FIG. 2 shows a perspective view of a deployment of an example of embodiment of a clamping device on another example of embodiment of a profile section.

FIG. 2 shows a perspective view of a deployment of an example of embodiment of a clamping device on another example of embodiment of a profile section. In the present description various first profile sections 10, 110 are cited or described as extension profiles 210, and similarly various cross members 20, 120, 220, 320 are possible profiles that can be screwed on in any combination. In each case similar features are designated with similar reference symbols. In the said FIG. 2 the second profile section 120 has upper and lower profile rails 122 and 123 respectively; these have three extension grooves on the upper and lower faces respectively, and thus comprise structures such as that of the post 10 with three grooves.

In this manner the provision of extension grooves 124 that are also oriented in the opposite direction is also enabled. In other respects the two side walls 127, which with the guidance grooves 26 form the cavity for purposes of accommodating the slider plate element 130, here slightly modified, are configured in the same manner as before. The locking screw 31 passes through the passage opening 42 of the retaining clamp 40, which has two alignment grooves 41 transverse to the passage opening. The alignment grooves 41 are provided for the purpose of engaging with the side walls 129 of the recess, and thus preventing any rotation of the said element 40. For a better alignment of the retaining clamp 40 moreover an indent is provided in the side walls 129 offset by the step 128, such that as the nut 50 is tightened on the screw 31 the retaining clamp 40 fits into the step 128 and in this final location the screw 31 tightens and as a result moves the hooks 32 and 33 in their course. At the same time the front face of the support post 10 is brought into contact with the front side wall 29 of the profile section 20. The said wall 29 is formed both from regions of the two side walls 27 and also from the front ends of the upper and lower profiles 22 and 23.

The slider plate 130 has, in the same manner as the slider plate 30 in FIG. 1, an upper edge 34 and a lower edge 36, wherein here the hooks 32 and 33 are arranged within the front edge or locating edge 149 of the slider plate 130. Thus the hook cavities 137 are in the form of L-shaped recesses, wherein in the interests of a secure suspension here the hooks 32 and 33 are also provided with appropriately projecting hooked noses 38; these support another form of attachment to a support post 10, as will be envisaged in what follows with a description of FIGS. 5 and 6.

Figure 3:
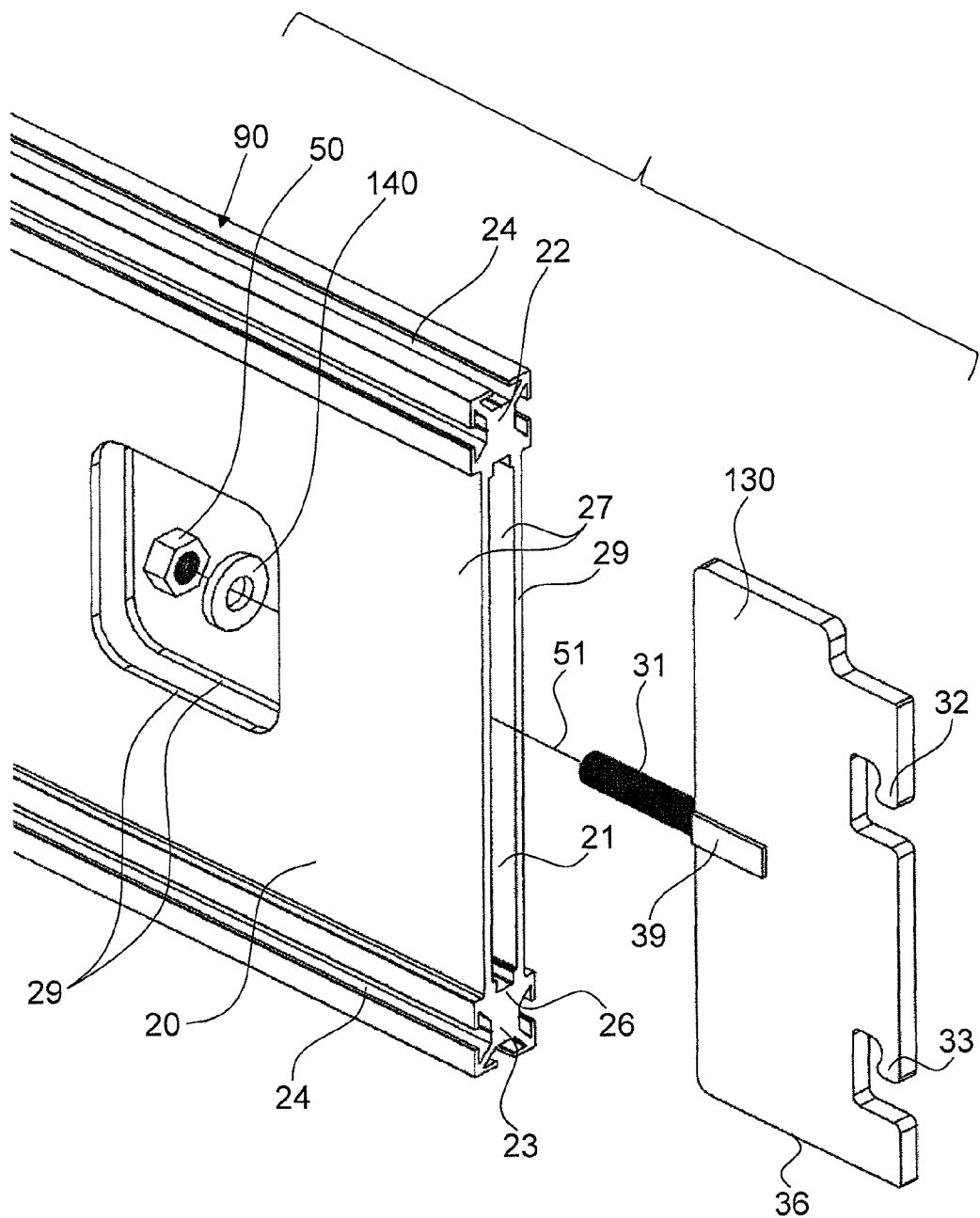
FIG. 3 shows a perspective view of a deployment of an example of embodiment of a clamping device with another example of embodiment of a clamping element.

FIG. 3 shows a perspective view of a deployment of an example of embodiment of a clamping device with another example of embodiment of a clamping element. In FIGS. 1 and 2 the clamping element was a retaining clamp 40 with vertical grooves 41 for purposes of oriented retention on the side walls 27 of the second profile section 20. In another simpler example of embodiment the said clamping element can also simply be a washer 140, through which the screw 31 is guided along the screw axis 51. In other respects the side wall 20 here corresponds to the cross member in FIG. 1 with an upper face 90 having only one groove 24.

Figure 4:
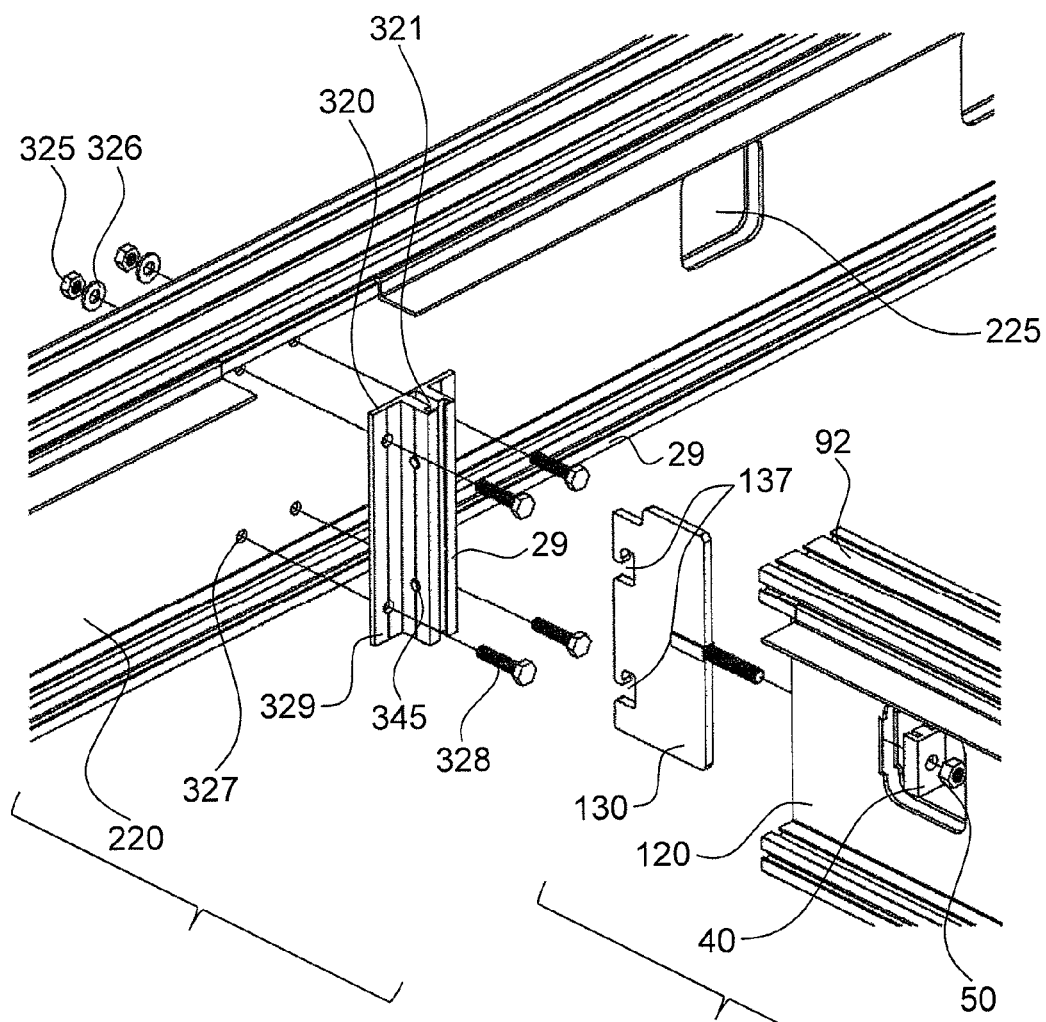
FIG. 4 shows a perspective view of a deployment of an example of embodiment of a clamping device with a cross member as a second profile section with a coupling element for the second profile section.

FIG. 4 shows a perspective view of a deployment of an example of embodiment of a clamping device with a cross member 220 as a second profile section with a coupling element 320 for a further second profile section 120 in the said figure. The coupling element is the second extension profile section 320, which here operates with the aid of four attachment screws 328, which are guided through openings in the longitudinal side flanges 329 of the screw-on profile 320, pass through corresponding attachment holes 327 in the cross member 220, so as then to be securely attached on the other side of the wall located there via a nut 325 and washer 326 combination. Thus it is possible on a second cross member 220, which can also take the form of the members 120 or 20, to arrange an intermediate profile between the posts so as to divert the load placed on the upper face 92 via the cross member, here 220, onto a support post 10 (not represented in the figure).

The screw-on profile 320 features a vertically aligned accommodation cavity 321, in which an undercut groove is provided in the front region. As in the case for the accommodation cavity 11, it is not absolutely necessary for the said groove to be undercut. In FIG. 1 a combination of slots is provided aligned along the post in the depth of the accommodation cavity 11 to enable the noses 32, 33 to gain access; here bolt holes 345 are provided transverse to the said accommodation cavity, through which, as will be described later, bolts 146 are passed; the latter will then engage with the hook cavities 37 of the slider plate. Here the attachment and location in the horizontal direction takes place once again via the combination of retaining clamps 40 and nuts 50. At the same time the front side wall 29 of the second profile section 120 in this situation is pulled onto the surfaces 29 of the extension profile section 320 and the cross member 220, and horizontally locked.

Figure 5:
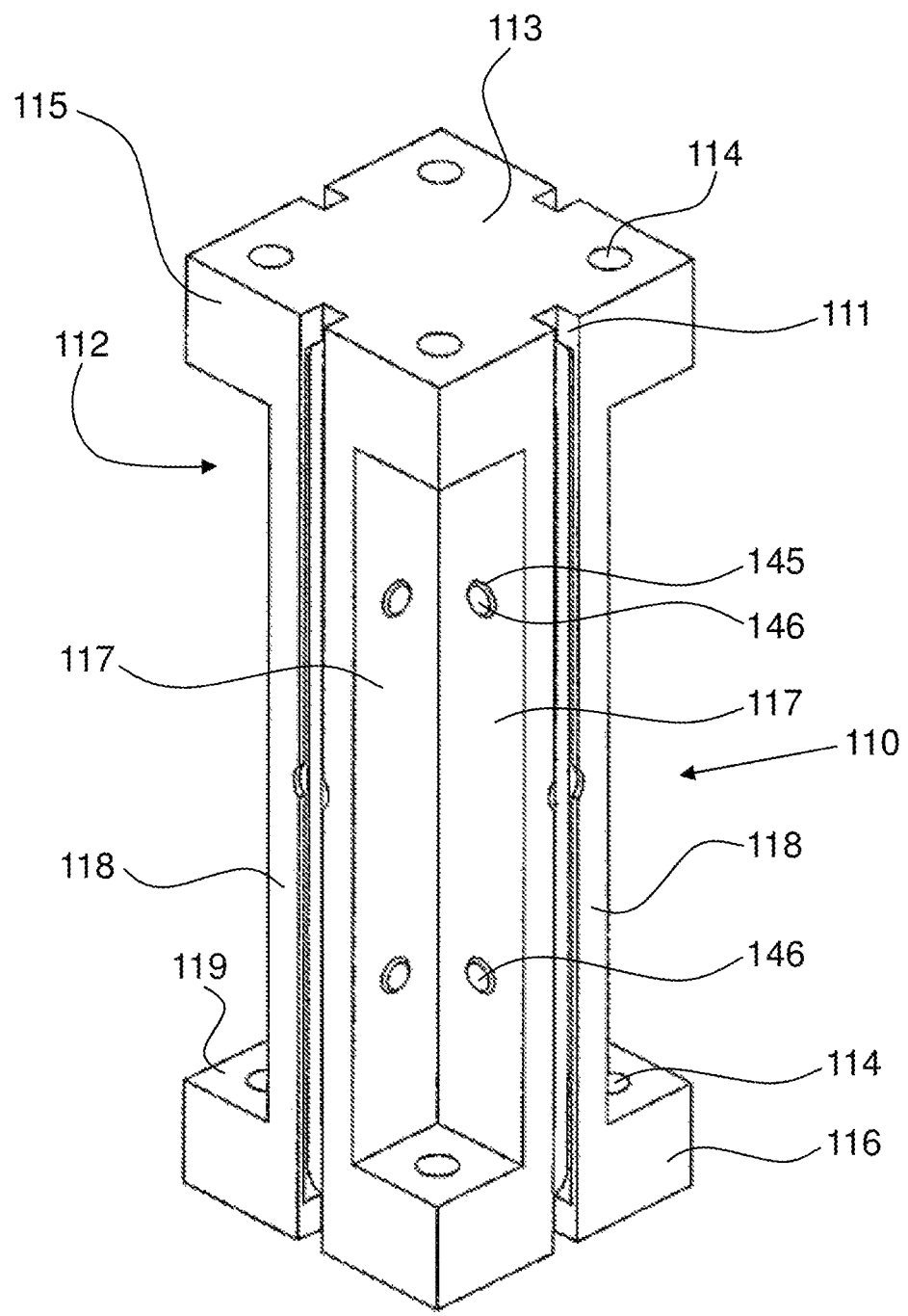
FIG. 5 shows a perspective view of a support head for an example of embodiment of a clamping device with a post profile.

FIG. 5 shows a support head 110, which is deployed in an interplay with the posts 10. The said support head 110 is essentially an adapter section, which, as the extension profile section 320, is provided precisely for the purpose of attaching the cross members 20, 120, etc. The support head 110 has an upper face 113 and a corresponding opposing lower face, which are both of plane configuration and in each of which passage holes 114 are provided in the corners in the longitudinal direction of the support head 110 for attachment to the correspondingly continuing profiles. The said corners have a flat corner surface 119. Here the import groove 111 is milled out of the material form and is undercut in the central region, as can be seen from the figure from the curved lead-in region at the ends of the groove. On all four corners corner recesses 112 exist over a significant length between the base section 116 and the cap section 115 of the support head 110. Transverse to each of the grooves 111 two bolt holes 145 are provided here through each wall 117 of the groove 111; a bolt 146 can be inserted through each of these. The said bolts 146 then provide an option for the slider plate 30, 130 to engage with these and to hook into these. At the same time the front wall 118 is then pulled, brought into and held in horizontal force fit contact with the opposing front wall 29 of the cross member 20.

Figure 6:
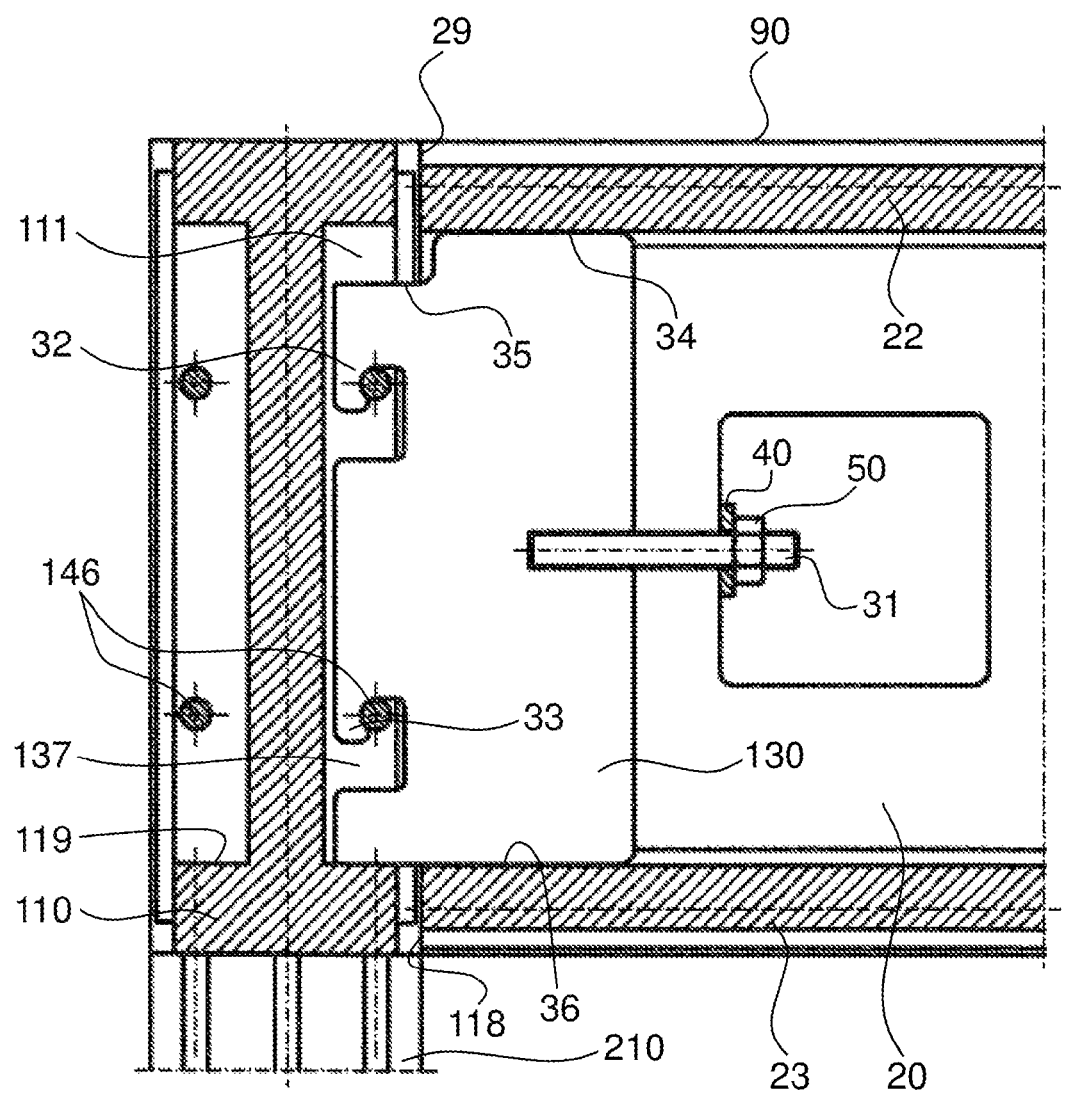
FIG. 6 shows a partially sectioned view of a support head in accordance with FIG. 5 with a positioned transverse profile with a clamping device in accordance with an example of embodiment of the invention.

FIG. 6 now shows in a sectioned view through such a support head 110 the lateral attachment of a slider plate 130. The support head 110 rests on an extension profile 210 and is, for example, connected with the latter by means of (not represented) screws and bolts through the openings 114. Through the transverse bolt holes 145 are introduced appropriate bolts 146; these can take the form, for example, of bolts having a 12 millimetre diameter, which in the region of the import groove 111 only have a thickness of 10 millimetres. The said thickness of 10 millimetres then also corresponds—with dimensional tolerances—to the diameter of the hook cavities 37.

In the deployments represented in FIG. 6 it is to be discerned that the upper stepped section 35 is necessary so as to utilise the necessary free space in the import groove 111, so that the upper hook 32 can engage over the bolt 146. The upper face 34 of the slider plate 30 rests against the lower face of the import groove 26 and thus accommodates the weight that is loaded on the element, for example on the upper face 90. The load is transmitted at an inclined angle (in FIG. 6) from the upper right-hand side to the lower left-hand side onto the lower side edge 36, and in particular onto the region that is supported on the lower face of the import groove 111 on the corner surfaces 119. As a result the weight of the loads relating to the cross member 20, originating from the upper face 90, does not rest on the closure elements, here the hook 32 and bolt 146, but rather on the support post 110 itself, and thus on the extension of the post profile 210. Thus the nut 50 is still only tightened up to ensure that the hooks 32 and 33 are located securely in their accommodation cavities 137. Essentially therefore it is only forces acting along the axis 51 in FIG. 4 that are accommodated by this means.

Thus a very efficient transfer of load from a cross member 20, 120, 220, 320 onto a post 10, 110, 210 is achieved in a simple manner with elements that are simple to construct, and which can accommodate high loads acting on the upper faces 90, 91, 92 in a secure manner.

Figure 7:
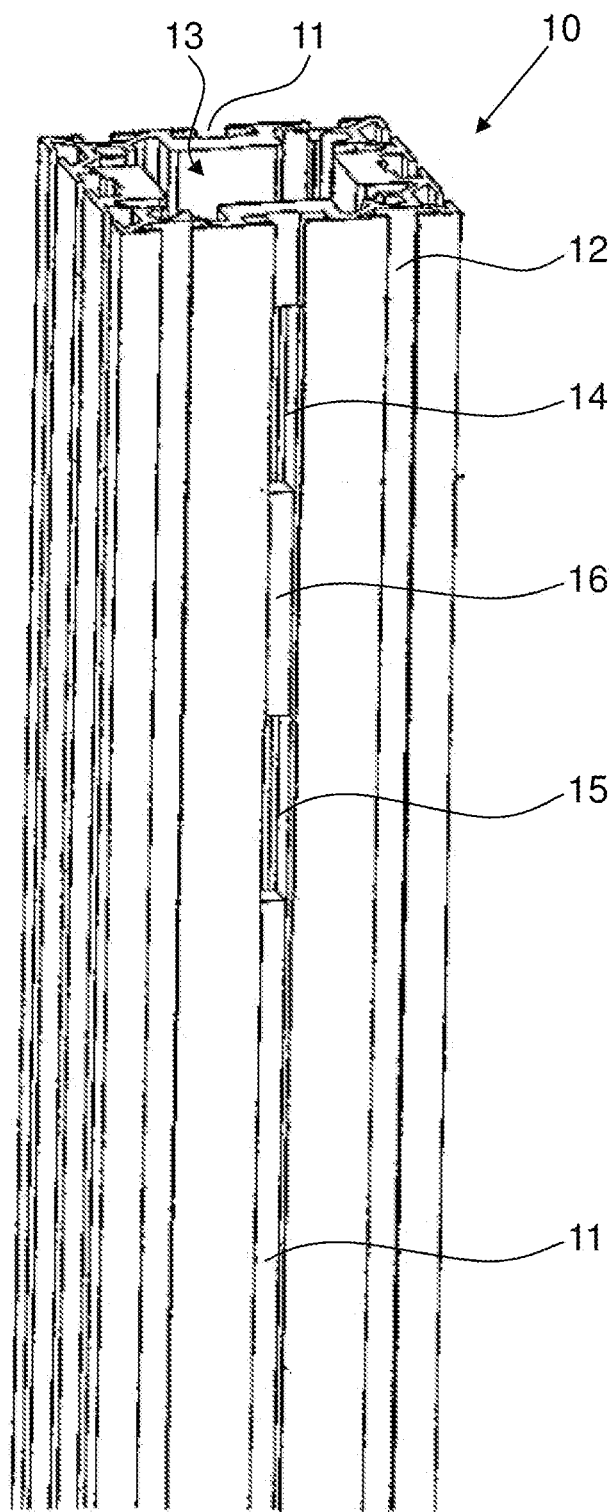
FIG. 7 shows a perspective view of the vertical post profile from FIG. 1.

FIG. 7 shows a perspective view of the vertical post profile 10 in FIG. 1. In the central groove 11 the two slots 14 and 16 can be discerned, between these the full area of the floor 16 of the groove 11 can be seen. The slots 14 and 16 have lengths such that they can accommodate the hooks 32 and 33. The height of the upper slot 14 is such that when the slider plate 30 is deployed the top of the second profile 20 is flush with the upper face 91. For example this can be a spacing of 2.5 centimetres, wherein the two hooks 32 and 33 project into slots 14 and 15 with a length of 5 centimetres, between which there exists a spacing of 6 centimetres. Three or more slots can also be provided such that the members 20 can be attached at different heights. The two slots 14, 15 can also be arranged at a greater distance from the upper edge. During deployment of the slider plate 30 the front edge 49 of the latter protrudes onto the groove floor 16 and thus impacts on the latter. It would also be possible to employ a deployment, not represented in the figures, into a third slot, on which the front section of the lower face 36 could then be set down.

Figure 8:
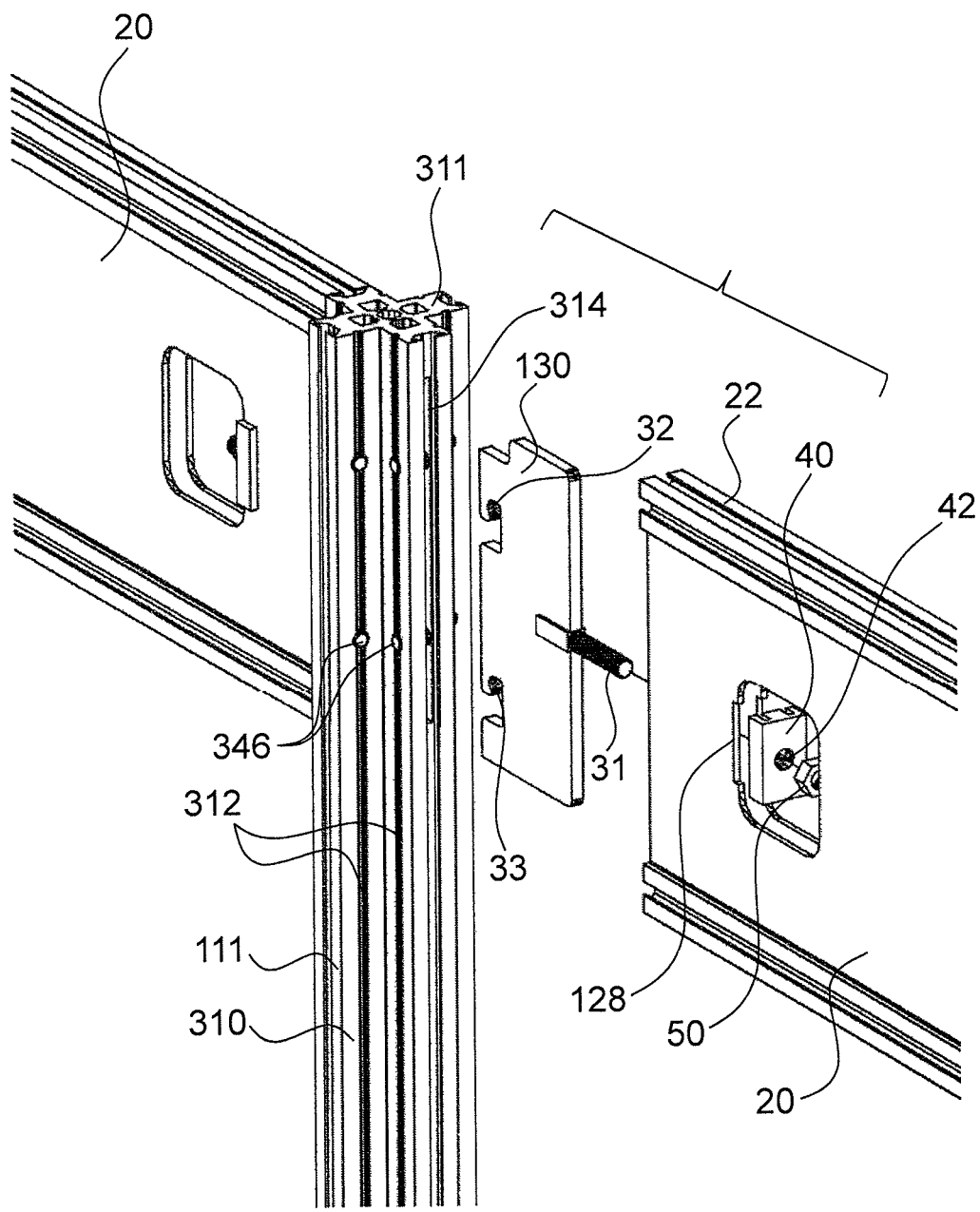
FIG. 8 shows a perspective view of a deployment of an example of embodiment of a clamping device in accordance with the invention on a variant of a vertical post profile.
Figure 9:
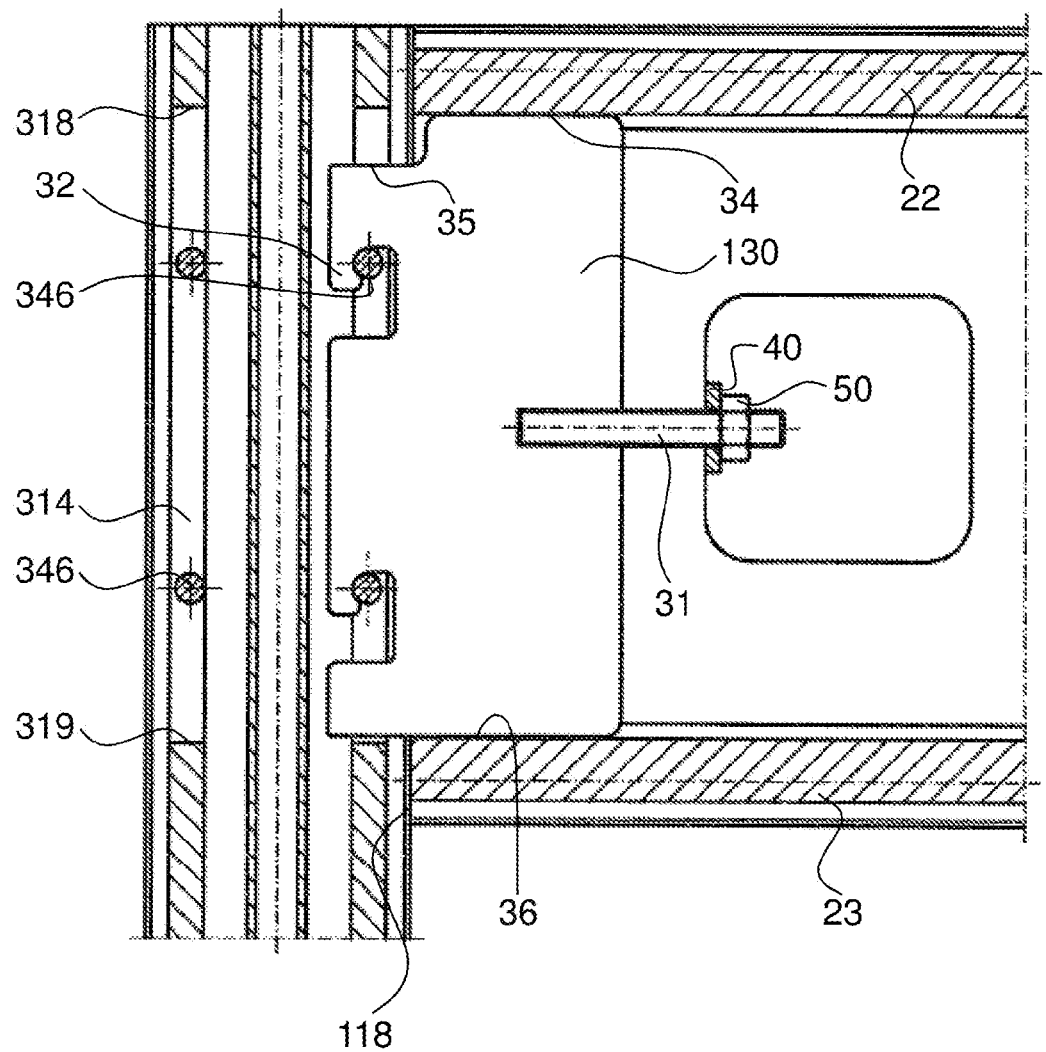
FIG. 9 shows a partially sectioned view of a profile in accordance with FIG. 8 with a positioned transverse profile with a clamping device in accordance with an example of embodiment of the invention.

FIG. 8 shows a perspective view of a deployment of an example of embodiment of a clamping device in accordance with the invention on a variant of a vertical post profile 310. FIG. 9 shows in addition a partially sectioned view of the profile 210 in accordance with FIG. 8 with a transverse profile 20 in position with a clamping device in accordance with an example of embodiment of the invention. The use of the same and similar reference symbols shows that the individual features of a post 310 can be connected with suitable transverse profiles 130. Here an individual front undercut groove 111 is provided, which is closed with a rear wall 311 to form a cavity in the profile 310. In principle it would be possible, as in the example of embodiment in accordance with FIG. 7, to provide a slot in the said wall so as to suspend the noses 32, 33 of a transverse profile. However, in load bearing tests the applicant has established that statically it is advantageous not to provide the load with lower edge 36 support on an appropriate abutment, but rather, as shown in FIGS. 8 and 9, to support the said lower edge 36 on the floor 319 of an accommodation slot 314. The upper section of the slider plate 30 can be pushed in between the upper edge 318 and the upper bolt 346, so as then to engage the hook 32 with the nose. Here the bolt 346 can be pushed into the appropriate transverse holes in the wall of the profile 310 in a captive press fit. Thus the load then rests on the one hand on the continuous side walls with side grooves 312 that are only slightly indented, and also on the lower edge 319 of the slot 314. Compared with the embodiment of FIG. 6 these are comparable conditions, and compared with FIG. 7 they are conditions that can bear more load, in particular because the profiles 310 are usually made from aluminium. A slot 314 is advantageously provided at suitable spacings along the profile 310. Here, as in the other examples of embodiment, the slider plate 130 is pulled back horizontally by the tightening of the nuts until the front edge 118 makes contact with the front edge of the profile 310, and is clamped there.

Figure 10:
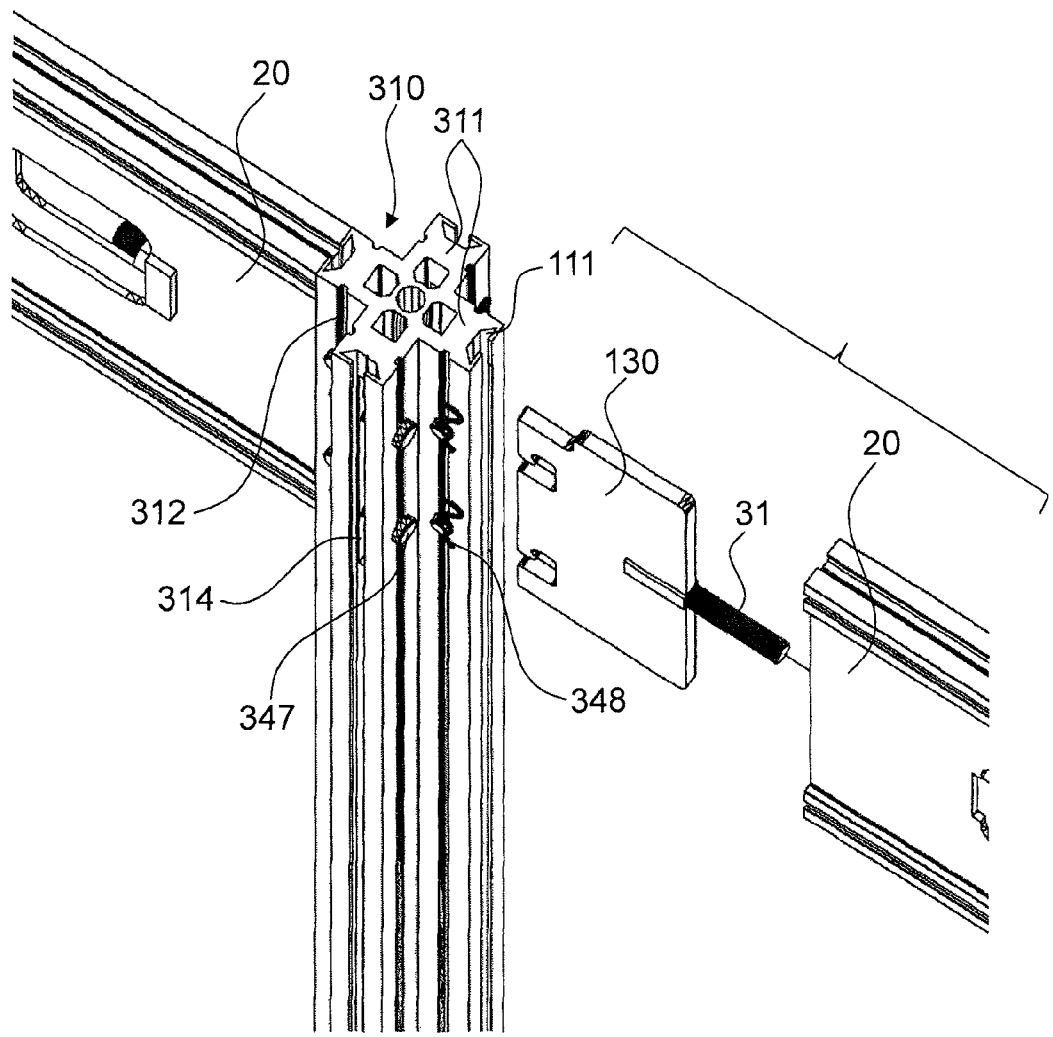
FIG. 10 shows a perspective view of a deployment of an example of embodiment of a clamping device in accordance with the invention on a further variant of the attachment of a vertical post profile.

FIG. 10 shows a perspective view of a deployment of an example of embodiment of a clamping device in accordance with the invention on a further variant of the attachment of a vertical post profile 310. Here in what is in other respects the same post 310 no bolts 346 are pressed into position, but rather these comprise a bolt head 347 designed as a flange and on the opposite side a retainer ring 348, or on occasions a pin. In this manner the bolts 346 in accordance with this example of embodiment are releasably secured against falling out, while in accordance with the example of embodiment of FIGS. 8 and 9 they are provided in a press fit as the security against loss. In the examples of embodiment represented two bolts are provided in each case; there could also be three or four bolts with slider plates 130 having correspondingly more noses 32, 33.

REFERENCE SYMBOL LIST

10 Post profile; first profile section
11 Central groove
12 Side groove
13 Inner cavity
14 Upper slot
15 Lower slot
16 Stop surface in the groove
20 Cross member; second profile section
21 Accommodation cavity
22 Upper profile rail
23 Lower profile rail
24 Extension grooves
25 Locking recess
26 Guidance groove
27 Side wall
29 Front side wall
30 Slider plate
31 Locking bolt/screw
32 Upper hook
33 Lower hook
34 Upper side face
35 Offset step
36 Lower side edge
37 Hook cavity
38 Hook nose
39 Connecting element
40 Retaining clamp
41 Alignment groove
42 Passage opening
49 Locating edge
50 Nut
51 Screw axis
90, 91, 92 Upper face
110 Support head; first profile
111 Import groove
112 Corner recess
113 Connecting surface
114 Hole
115 Cap section
116 Base section
117 Groove wall
118 Front side wall
119 Corner surface
120 Cross member; second profile section
122 Upper profile rail
123 Lower profile rail
124 Extension grooves
125 Locking recess
128 Step
129 Side walls in recess
130 Slider plate 137 Hook cavity
140 Washer
145 Bolt hole
146 Bolt
149 Locating edge
210 Extension profile
220 Cross member; second profile section
225 Supply line recess
310 Post profile; first profile
311 Rear wall of the import groove
312 Side groove
314 Slot
318 Lower edge
319 Support surface
320 Second extension profile section; screw-on profile
321 Accommodation cavity
325 Nut
326 Washer
327 Attachment hole
328 Attachment screw
329 Longitudinal side flange
345 Bolt hole
346 Bolt
347 Bolt head
348 Retainer ring

The invention claimed is:

1. A clamping device for the releasable connection of a first profile section with a second profile section, the clamping device comprising:
at least one locking element, adapted to fit in a locking element recess of the first profile section;
at least one hook element for purposes of engaging with the at least one locking element;
a slider plate,
wherein the at least one hook element is aligned in a plane of the slider plate and arranged on the slider plate, the at least one hook element configured to have a hook cavity in the form of an L-shaped recess, and
a clamping element, adapted to fit in an accommodation cavity of the second profile section,
wherein the at least one hook element can be brought into releasable retentive engagement with the at least one locking element by means of the clamping element along a clamping direction,
wherein the at least one hook element is complementary to the at least one locking element,
wherein the at least one locking element is a bolt, which on assembly is to be positioned within the L-shaped recess, latched onto the at least one hook element and tightened along a first direction relative to the slider plate by means of the clamping element for locking purposes, and
wherein the at least one hook element comprises a nose, extending into the L-shaped recess, which on assembly provides a positive lock for the hook element onto the at least one bolt in both upward and downward directions perpendicular to the first direction.

2. The clamping device in accordance with claim 1, wherein the clamping element comprises a screw connected with the slider plate and a nut, wherein the screw and the nut are provided on an opposing side of the slider plate relative to the hook element.

3. The clamping device in accordance with claim 1, wherein the at least one bolt at a first end has a flange, and at a second end has a pin, a retaining ring in a groove, or another element preventing the at least one bolt from falling out.

4. A system for the releasable connection of a first profile section with a second profile section, wherein the system comprises a first profile section, a second profile section and a clamping device, the clamping device comprising:
at least one locking element;
at least one hook element for purposes of engaging with the at least one locking element;
a slider plate,
wherein the at least one hook element is aligned in a plane of the slider plate and arranged on the slider plate, the at least one hook element being configured to have a hook cavity in the form of an L-shaped recess,
a clamping element,
wherein the first profile section comprises a locking element recess for accommodating the at least one locking element of the clamping device,
wherein the second profile section comprises an accommodation cavity for accommodating the clamping element of the clamping device, wherein the at least one hook element can be brought into releasable retentive engagement with the at least one locking element by means of the clamping element along a clamping direction,
wherein the at least one hook element is complementary to the at least one locking element,
wherein the slider plate can be clamped with an upper face in guiding and load-bearing contact in the second profile section,
wherein the at least one locking element is a bolt, provided transversely through the locking element recess and within transverse holes,
which on assembly is to be positioned within the L-shaped recess, latched onto the at least one hook element and tightened along a first direction relative to the slider plate by means of the clamping element for locking purposes, and
wherein the at least one hook element comprises a nose, extending into the L-shaped recess, which on assembly provides a positive lock for the hook element onto the at least one bolt in both upward and downward directions perpendicular to the first direction, and
wherein a lower face of the hook cavity can be supported on an element or elements connected with the slider plate in a load-bearing manner.

5. The system in accordance with claim 4, wherein the clamping element comprises a screw connected with the slider plate, projecting into the accommodation cavity provided behind the slider plate in the second profile section and a nut provided in the accommodation cavity, so that the screw can be clamped with the nut against the second profile section.

6. The system in accordance with claim 4, wherein a wall of the first profile section behind the locking element recess in the region of the at least one bolt comprises a slot so as to permit the slider plate to engage behind the at least one bolt.

7. The system in accordance with claim 6, wherein a lower edge of the slot is configured so as to serve as an abutment for a lower edge of the slider plate.

8. The system in accordance with claim 4, wherein the at least one bolt at a first end has a flange projecting over the hole diameter of walls forming the locking element recess in the first profile section, and at a second end has a pin, a retaining ring in a groove, or another element preventing the at least one bolt from falling out.

9. The system in accordance with claim 4, wherein a lower face of the slider plate can be supported in a load-bearing manner on a surface of the first profile section.

\* \* \* \* \*